(12) United States Patent
Jarasson

(10) Patent No.: US 6,599,051 B1
(45) Date of Patent: Jul. 29, 2003

(54) WINDSHIELD WIPER FOR AN AUTOMOBILE COMPRISING ADVANCED MEANS FOR ARTICULATING THE WIPER BLADE ON SAID WINDSHIELD WIPER

(75) Inventor: Jean-Michael Jarasson, Chelles (FR)

(73) Assignee: Valeo Systemes d'Essuyage (FR)

( * ) Notice: Subject to any disclaimer, the term of this patent is extended or adjusted under 35 U.S.C. 154(b) by 0 days.

(21) Appl. No.: 09/869,237

(22) PCT Filed: Dec. 15, 1999

(86) PCT No.: PCT/FR99/03169

§ 371 (c)(1),
(2), (4) Date: Jun. 26, 2001

(87) PCT Pub. No.: WO00/40444

PCT Pub. Date: Jul. 13, 2000

(30) Foreign Application Priority Data

Dec. 30, 1998 (FR) .............................. 98 16616

(51) Int. Cl.⁷ ................................. A47L 1/00
(52) U.S. Cl. ............ 403/326; 15/250.32; 15/250.351; 15/250.361
(58) Field of Search ...................... 403/321, 325, 403/326, 327, 329, 322.1, 322.3, 322.4; 15/250.32, 250.351, 250.361

(56) References Cited

U.S. PATENT DOCUMENTS

| 2,982,586 | A | * | 5/1961 | Gliebe | 403/109.3 |
| 3,908,244 | A | * | 9/1975 | Ursel | 15/250.32 |
| 4,286,351 | A | * | 9/1981 | Mower et al. | 15/250.32 |
| 4,418,441 | A | * | 12/1983 | van den Berg | 15/250.32 |
| 4,675,934 | A | * | 6/1987 | Dal Palu | 15/250.32 |
| 4,788,736 | A | * | 12/1988 | Arai et al. | 15/250.32 |
| 4,896,987 | A | | 1/1990 | Pethers | |
| 4,909,653 | A | * | 3/1990 | Biggs | 15/250.32 |
| 4,971,472 | A | * | 11/1990 | Pethers | 15/250.32 |
| 5,073,060 | A | * | 12/1991 | Pethers | 15/250.32 |
| 5,729,861 | A | * | 3/1998 | Journee | 15/250.31 |
| 6,161,249 | A | * | 12/2000 | Hussaini | 15/250.32 |
| 6,286,176 | B1 | * | 9/2001 | Westermann et al. | 15/250.32 |

FOREIGN PATENT DOCUMENTS

| EP | 0231129 | 8/1987 |
| FR | 2453757 | 11/1990 |
| FR | 2759048 | 8/1998 |

* cited by examiner

Primary Examiner—Eric K. Nicholson
Assistant Examiner—James M. Hewitt
(74) Attorney, Agent, or Firm—J. Gordon Lewis

(57) ABSTRACT

A windshield wiper, in which an element of the frame of the wiper blade is articulated on the end of a wiper arm by a connector that is articulated on the frame. The connector includes a substantially inverted U-shaped front body which overlaps onto the center part of the hinge of the frame, such that the longitudinally sliding connector is accommodated in the front end of the arm. The connector includes a lock mechanism that locks in a longitudinally direction in relation to the arm. The connector also includes a retaining rod extending vertically with clearance through a hole that is dead center with the center part of the hinge of the frame element.

11 Claims, 3 Drawing Sheets

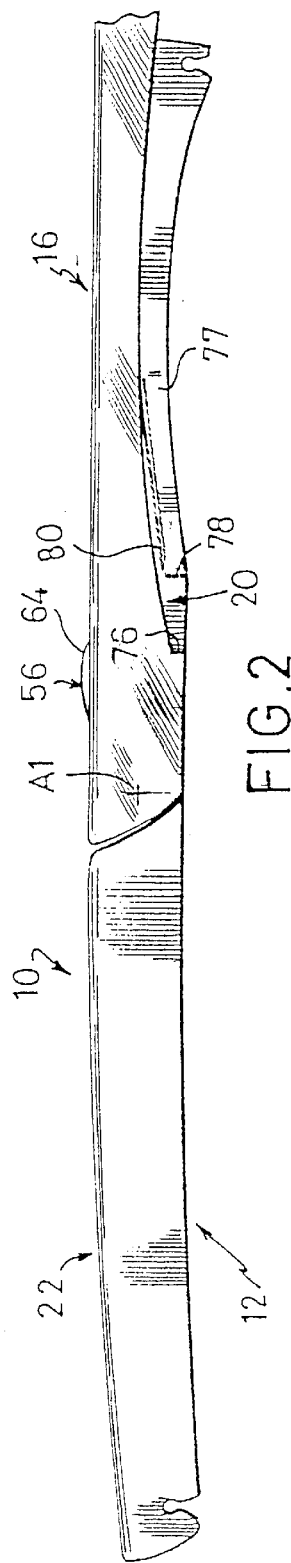
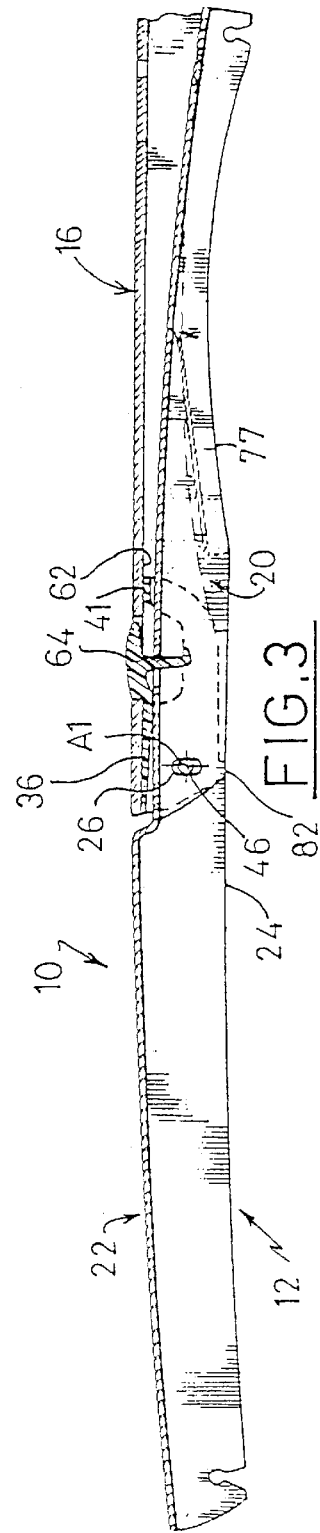
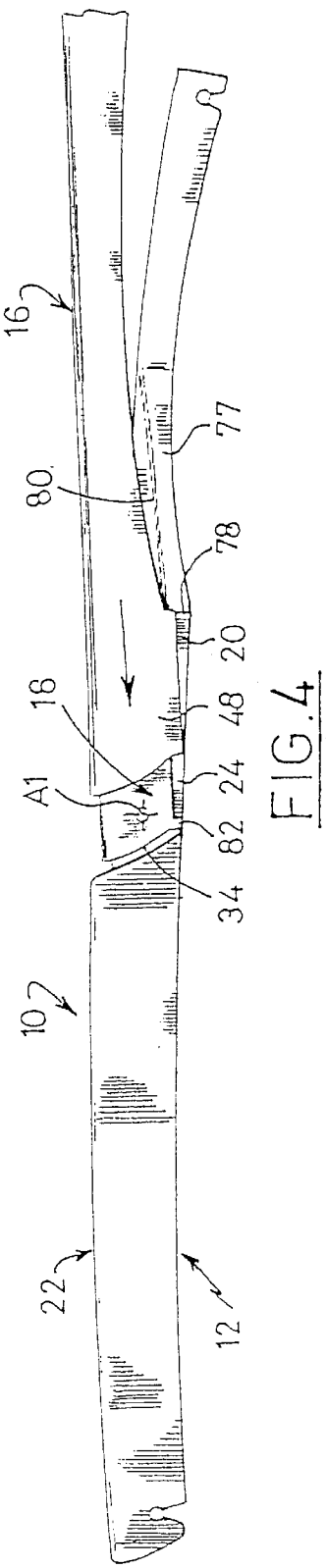

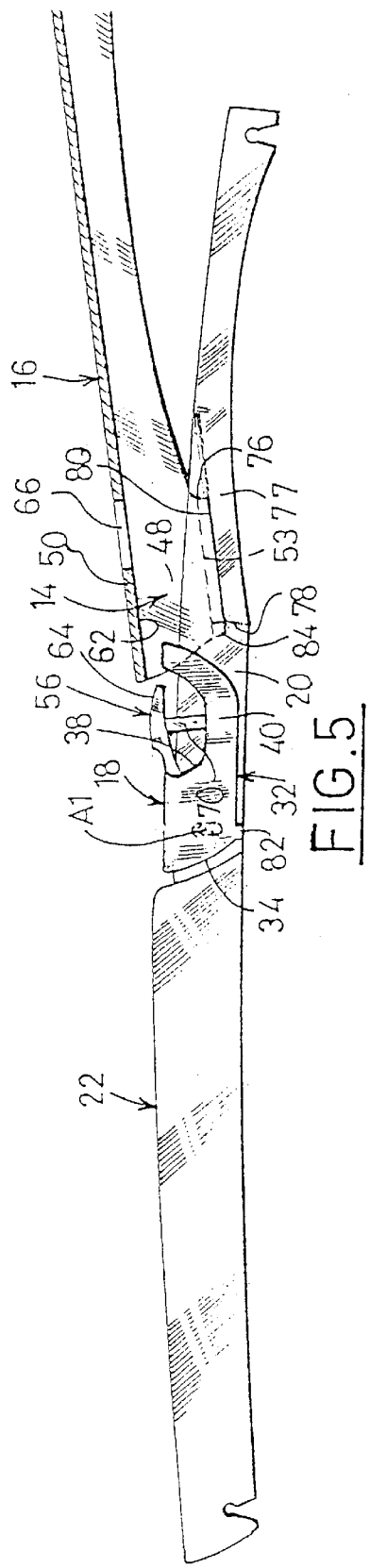
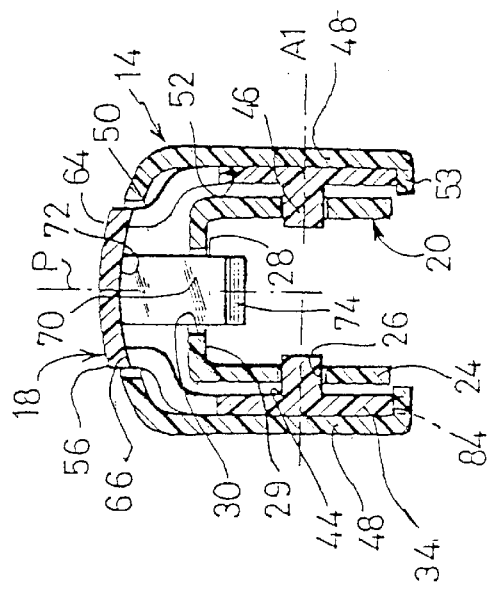

WINDSHIELD WIPER FOR AN AUTOMOBILE COMPRISING ADVANCED MEANS FOR ARTICULATING THE WIPER BLADE ON SAID WINDSHIELD WIPER

BACKGROUND

This invention concerns a motor vehicle windshield wiper comprising advanced means for articulating the wiper blade on a wiper arm.

This invention concerns more specifically a motor vehicle windshield wiper, of the type in which a wiper blade is articulated at the longitudinal front end of a wiper arm, around a transversal horizontal axis, via a connector that is articulated on the blade.

According to a known conception of the mounting articulated on a blade at the end of an arm, the connector is fit together elastically according to the radial direction on an articulation rod of the blade and the front end of the arm is longitudinally curved in order to form a hook in which the connector, once mounted on the blade, must be longitudinally inserted from the rear to the front.

For reasons of rigidity and compact size of articulation, but also for aesthetic questions, the connector is generally received between two lateral flanks of the blade that are linked via the articulation rod. In that way, the front end of the arm must also be received between the flanks of the arm, the front of the connector in relation to the blade in order to allow the insertion of the connector in the hook of the arm.

Such a mounting, if it presents reliability guarantees, reveals itself to be particularly delicate to perform and imposes that the blade presents, in the front of the articulation rod, an opening placed in an upper back of the blade in order to allow the insertion of the front end of the arm. Such an opening remains at least partially visible after the mounting of the blade on the arm.

A conception has already been proposed in which the articulation means of the blade on the arm allows an easy mounting and removal of the blade, even by a person who is not experienced. In effect, the vehicle's owner is encouraged to regularly change their wiper blades and must be able to proceed through this operation in the simplest way possible.

Moreover, the wipers being visible parts on the exterior of the vehicle, it is desirable to give them an aesthetic character, while avoiding as much discontinuity in the form as possible.

A windshield wiper of the type described above was thus proposed, in which the connector comprises articulation means that are carried via two parallel, longitudinal, vertical flanks between which the blade is received, in which the flanks are transversally spread opposite each other towards a mounting position in order to allow the articulated mounting of the connector on the blade then are returned towards an articulation position in which the articulation means of the connector work with the complimentary means of the blade, and in which the flanks of the blade are received between two lateral flanges of the end of the arm that block the flanks of the connector from spreading transversally from their articulation position towards their mounting position.

The connector comprises a front body that is in the shape of an upside-down U in cross-section and which straddles the blade and thus the two flanks stretch towards the rear.

The connector is received by longitudinal sliding into the front end of the arm, and the connector comprises means for assuring its locking according to the longitudinal direction in relation to the arm. To this effect, the flanks of the connector are received via longitudinal sliding, each respectively in two holes defined by the internal sides opposite from the two lateral flanges of the front end of the arm and which are unblocked towards the front, and the connector is inserted longitudinally from the front to the rear between the lateral flanges.

The front end of the arm comprises an upper transversal back that joins the two flanges, the connector comprising an elastic tongue that reaches horizontally towards the rear when the front body to which it is linked by it front end forming a hinge with a horizontal axis, the tongue reaches opposite from an interior side of the back of the end of the arm, the tongue comprises a boss that is received in a corresponding aperture formed in the upper back of the arm in order to longitudinally block the connector in relation to the arm, and the boss is susceptible to be retracted towards the bottom via pivoting the elastic tongue in order to free the longitudinal blockage from the connector in relation to the arm.

SUMMARY

The invention concerns an improvement to a wiper of this type specifically allowing the guarantee that the different pieces reside at least partially linked between them in case of a rupture of different parts of the means of articulation of the wiper blade on the wiper arm.

With this goal, the invention proposes a wiper of the type in which the connector comprises articulation means that are carried by two parallel, vertical, longitudinal flanks between which is received a central articulation part of the mounting element, of the type in which the connector comprises a front body that is the shape of an upside-down U in cross-section and which straddles the central articulation part of the mounting element and the two flanks that reach towards the rear in relation to the front body, of the type in which the connector is received via longitudinal sliding in the front end of the arm, and of the type in which the connector comprises the means to assure its blockage according to the longitudinal direction in relation to the arm, characterized by the connector comprises a holding rod that reaches vertically with play across from a hole formed opposite in the central articulation part of the mounting element.

According to other characteristics of the invention:

the free lower end of the holding rod comprises a holding beak in order to keep the connector vertical, with play, in relation to the mounting element;

the holding rod is received longitudinally with play in the hole formed in a vertical slit with a longitudinal orientation;

the front end of the arm comprises an upper transversal back, the connector comprises an elastic tongue that reaches horizontally towards the rear while the front body to which it is linked via it front end forming a hinge with a horizontal axis, the tongue reaches opposite from a lower face from the lower back of the arm, the tongue comprising a boss that is received in a corresponding aperture formed in the upper back of the arm in order to longitudinally block the connector in relation to the arm, and the holding rod reaches vertically from the lower side of the tongue of the connector;

the boss is susceptible to be retracted towards the bottom via pivoting of the elastic tongue in order to free the longitudinal blocking of the connector in relation to the arm;

the front end of the arm comprises a rear abutment that, in the mounted position of the arm on the wiper blade, reaches opposite from a abutment surface oriented towards the front and that is formed opposite from an external lateral side of the mounting element;

the flanks of the connector are received between two lateral flanges of the front end of the arm, and the rear abutment is made up of a rear edge of a lateral flange;

the surface of the abutment oriented towards the front is a front edge that longitudinally marks a portion in relief of the external lateral face of the mounting element;

the portion in relief is vertically defined towards the top by an upper edge with a longitudinal orientation and inclined in order to make a guiding ramp of the front end of the arm during the mounting of the latter onto the connector;

the connector is inserted longitudinally from the front to the back between the lateral flanges of the front end of the wiper arm;

the flanks of the connector are spread transversally away from each other towards a mounting position in order to allow the articulated mounting of the connector on the central articulation part of the mounting element then are led towards an articulation position in which the articulation means of the connector cooperate with the complementary means of the mounting element, and the flanks of the mounting element of the blade are received between two lateral flanges of the end of the arm that prevent the flanks of the connector from spreading transversally from their articulation position towards their mounting position;

the flanks of the connector comprise two lugs notably cylindrical with a horizontal axis that reach away from each other while the sides opposite the two flanks, and which are designed to be received in the corresponding orifices of the sides of the central articulation part of the mounting element while the flanks are in the articulation position in order to assure the articulated mounting of the connector on the blade.

BRIEF DESCRIPTION OF THE DRAWING

Other characteristics and advantages of the invention will appear in the reading of the detailed description that follows, for the comprehension of which one should refer to the attached drawings in which:

FIG. 2 is a lateral view of the wiper on which all of the components of FIG. 1 are illustrated in a mounted and assembled position;

FIG. 3 is a cross-section view on a vertical median plane of the wiper of FIG. 2;

FIG. 4 is an exterior view similar to that in FIG. 2 that illustrates the front end of the wiper arm during the mounting on the connector;

FIG. 5 is a view similar to that in FIG. 4 on which the wiper arm is illustrated with a longitudinal cut and in a preceding position illustrating its guiding on the mounting element; and FIG. 6 is a view in a bigger scale of a cross-section of the wiper in FIG. 2.

DETAILED DESCRIPTION

Figure 1:
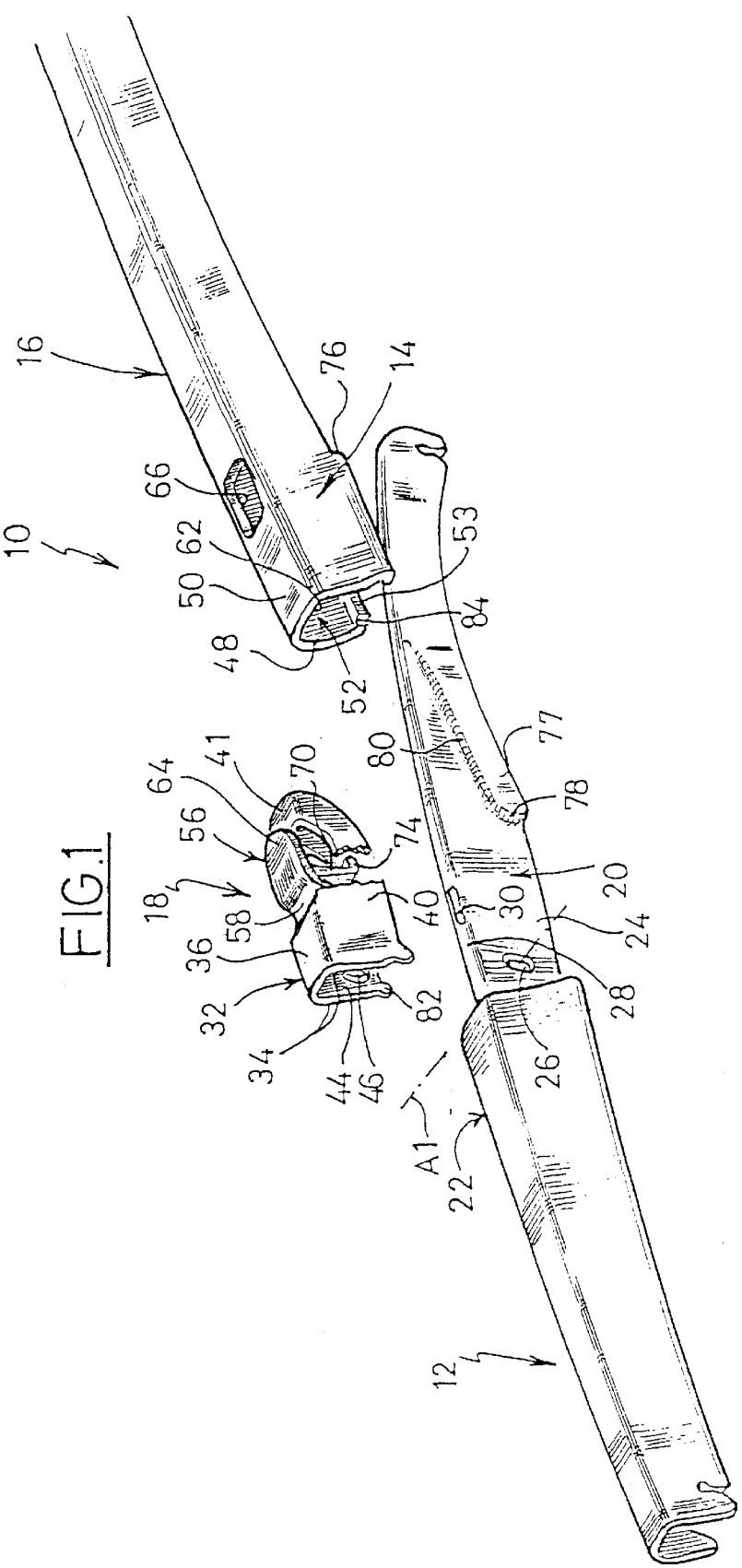
FIG. 1 is a spread perspective view of the principal components of a wiper according to the invention.

In the description that is going to follow, one will use, in a non-limiting basis, the terms horizontal, vertical, upper, lower, front, rear, etc. in reference to the Figures in order to facilitate the comprehension and the reading of the claims.

Represented on the Figures is a wiper 10 comprising a wiper blade 12 that is designed to be mounted articulated around a transversal axis A1, horizontal in the Figures, at the longitudinal front end 14 of a wiper arm 16.

The wiper presents symmetry in relation to a vertical and longitudinal median plane P.

To this effect, a connector 18 is planned that is mounted articulated on a central articulation portion 20 of a mounting element in the shape of a principal stirrup 22 of the blade 12 and that is designed to be fixed to the front end 14 of the arm 16.

As one can see in the Figures, the central articulation part 20 of the mounting element 22 comprises two longitudinal, lateral flanks 24 that are notably parallel and that are each provided with a circular orifice 26 of the axis A1. The two flanks 24 are joined by an upper back 28 and a longitudinal orientation slit 30 is equipped in the upper back 28 at the level of the connector 18.

The connector 18 comprises a front body 32 that presents, in cross-section, an upside-down U shape comprising two lateral and notably parallel branches 34 and an upper transversal branch 36 notably horizontal. The front body 32 is designed to straddle the central articulation part 20 of the mounting element 22 of the wiper blade 12.

From a rear transversal face 38 of the front body 32, two parallel flanks 40 reach longitudinally towards the rear in the extension of the vertical branches 34 of the front body 32. The flanks 40 are the shape of plates that reach in a vertical plane and are parallel to each other in a free state. However it is possible, via elastic deformation, to spread the flanks 40 transversely away from each other with the vertical branches 34.

The flanks 40 are joined between them, in proximity, at their rear ends via an upper transversal support 41 that reaches notably in the same horizontal plane as the upper transversal branch 36.

The prolonged vertical branches 34 by the flanks 40 each carry, on an internal face 44 turned in the direction of the opposite flank (see FIG. 4), a cylindrical lug 46 that reaches transversally according to the axis Al in the direction of the opposite flank 40. In the free state, the internal faces 44 are spread away from each other at a distance notably equal to the transversal length of the central articulation portion 20 of the mounting element 22.

In this way, in the free state, the cylindrical lugs 46 are susceptible to be received in the circular orifices 26 of the flanks 24.

However, while the flanks 40 are transversally spread away from each other (notably by elastic deformation), the lugs 46 are removed from the orifices 26 such that the connector 18 can be inserted or removed according the vertical direction in relation to the mounting element 22.

Of course, it is planned that the lugs are carried by the blade 12 and are received in the orifices placed in the branches 34 of the connector 18.

It is notable that it is planned that there is sufficient space between the upper back 28 of the mounting element 22 and the upper transversal branch 36 of the front body 32 of the connector 18 in order to allow sufficient clearance in rotation of the connector 18 in relation to the blade 12.

The branches 34 prolonged by flanks 40 of the connector 18 are designed to be received in the interior of the front end 14 of the arm 16 in such a manner that the end 14 prevents all transversal spreading of the branches 34 prolonged by the flanks 40. Thus, while the connector 18 is mounted on the blade 12 and is inserted in the front end 14 of the arm 16, the lugs 46 cannot be inserted in the orifices 26, which prevents all dismounting of the connector 18 in relation to the blade 12.

To this effect, the front end 14 of the arm 16 comprises two vertical longitudinal flanges 48 that are joined by an upper transversal back 50 and between which the branches 34 prolonged by the flanks 40 of the connector 18 are designed to be received.

The transversal flanges 48 interiorly mark the opposing lodgings 52 opposite from each other notably in the same shape as the branches 34 prolonged by the flanks 40 in such a way that they can be introduced there longitudinally from the front to the rear. The lodgings 52 are defined vertically towards the bottom via the ledges 53 that reach transversally towards the interior by thus preventing all movement of the connector 18 other than a simple longitudinal sliding.

Preferably, the front end 14 of the arm 16 and the mounting element 22 are conceived in such a manner that their respective lateral external faces are arranged in the extensions of each other in order to assure the aesthetic continuity between the arm 16, the front end 14 of which masks the connector 18 while this latter is longitudinally received between the flanges 48.

As one can see in FIG. 5, while the blade 12 is mounted on the arm 16, each branch 34 extended by a flank 40 of the connector 18 is transversally inserted between a side 24 of the mounting element 22 and a flange 48 of the arm 16, without the possibility of movement and thus without the possibility of the uncoupling of articulation.

One has elsewhere planned the means allowing the longitudinal blocking of the connector 18 to the interior of the front end 14 of the arm 16.

Advantageously, these means allow an easy unblocking in order to allow the replacement of the blade 12 when it is used up.

With that in mind, the connector 18 contains a tongue 56 that is, for example, created in the shape of a horizontal plate element, and that reaches longitudinally towards the rear, notably in the extension of the upper transversal branch 36 of the front body 32 of the connector 18. The front end 58 of the tongue 56 forms an axis hinge notably horizontal for the tongue 56.

While the connector 18 is inserted in the front end 14 of the arm 16, an upper face 60 of the tongue 56 is opposite a lower face 62 of the upper transversal back 50 of the front end 14.

On this upper face 60, the tongue 56 comprises a boss 64 that is received in an aperture 66 formed in the upper back 50 of the arm 16 in such a way as to longitudinally immobilize the connector 18.

However, an upper surface of the boss 64, that passes by the exterior of the end 14 of the arm 16, allowing the pushing in of the boss 64 towards the interior across the aperture 66 making the tongue pivot 56, to go against its elasticity, around its front end 58. Thus it is possible to remove the boss 64 from the aperture 66, which allows the longitudinal removal of the connector 18 towards the front outside of the front end 14 of the wiper arm 16.

The assembly of the wiper unit 10 comprises the following steps.

The connector is first mounted on the blade 12 by spreading the flanks 40 of the connector 18 transversally away from each other in such a way as to be able to insert the connector 18 vertically from the top to the bottom straddling the central articulation portion 20 of the mounting element 22 of the blade 12.

Then the blade 12 and connector 18 unit is longitudinally inserted from the front to the rear on the interior of the front end 14 of the arm 16 in such a way that the branches 34 extended by the flanks 40 of the connector 18 are received in the lodgings 52 defined by the flanges 48 of the front end 14.

During this operation, it is necessary to wipe the boss 64 towards the bottom. This can be achieved by giving the upper face of the boss 64 a sloping shape inclined towards the back and towards the rear.

When the boss 64 arrives longitudinally opposite from the aperture 66 of the arm 16, the tongue 56 elastically returns to its free position in which the boss 64 is received in the aperture 66, preventing all displacement towards the front of the connector 18, and thus of the blade 12, in relation to the arm 16.

Conforming to the specifications of the invention, the wiper comprises means for increasing the reliability of use of the wiper, notably in case of the rupture of certain elements in order to keep the wiper blade 12 on the wiper arm 14, 16.

With this goal, the connector 18 comprises a vertical holding rod 70 that reaches from the lower face 72 of the tongue 56 in the direction of the central articulation portion 20 of the mounting element 22, in the interior of which it reaches to the slit 30 in the lower back 28.

The holding rod 70 is received with longitudinal play in the slit 30 in such a manner as to allow, in normal use, functioning without interference of the rode with environmental elements.

The lower free end 74 of the rod 70 is shaped as a holding beak or hook which reaches longitudinally towards the rear opposite from a portion of the lower face 29 of the back 28 but with significant vertical play in a manner to, in normal use, allow functioning without interference of the beak 74 of the rod 70 with environmental effects.

Moreover, each flange 48 of the front end 14 of the wiper arm 16 is defined longitudinally towards the rear by an abutment edge 76, with a vertical orientation that, in the mounted and assembled position of the wiper arm on the connector 18 and on the wiper blade 12 reaches opposite, with slight longitudinal play, from an abutment edge belonging to the mounting element 20.

More precisely, the lateral external face of each flank 24 of the mounting element 22 comprises a part in relief 77 forming a thicker part that is longitudinally defined towards the front by a vertical front abutment edge 78 and vertically towards the top by an upper edge 80 inclined in relation to the general longitudinal direction of the mounting element 22.

In case of rupture of the push button 64, that is to say the tongue 56, the mounting element cannot longitudinally escape outside of the wiper arm 16, 14 because the abutments 76 cooperate thus with the abutments 78.

The holding rod 70 of the button 64 also keeps the mounting element 22 and it prevents, thanks to the holding beak 74, the button 64 and the tongue 56 from vertically escaping.

In case of rupture of the two pins 46, the holding rod 70, like the preceding, holds the mounting element 22 longitudinally and if the holding rod breaks, it is the cooperation of the abutments 76 and 78 that intervene to hold the mounting element 22 in relation to the wiper arm 16, 14.

The inclined shape of the upper edge 80 of the thicker parts 77 assure, as one can see in FIG. 5, the guiding ramp function of the front end 16 of the wiper arm 14 in such a manner as to position this front part directly in line with the connector 18 carried by the mounting element 22 in order to facilitate the final mounting of the wiper arm 14 on the wiper blade 12, 22.

In addition the upper edge 80 can be slightly curved convexly in order to allow the mounting whatever the angular orientation of the wiper arm 14, 16 in relation to the mounting element 22.

However, in order to avoid in normal functioning the efforts and repeated shocks of the rear part of the button 64 in the window or aperture 66, each vertical branch 34 of the front body 32 of the connector 18 comprises, at its lower front end, a vertical pin 82 that is received in a corresponding notch 84 formed at the front free end of the corresponding edge 53 of the flange 48 of the front end 16 of the wiper arm 14.

In summary, the present invention is a motor vehicle wiper in which a mounting element belonging to a wiper blade is articulated at the front longitudinal end of a wiper arm, around a transverse horizontal axis, via a connector which is articulated on the mounting element, the connector including articulation means carried by two parallel, longitudinal, vertical flanks between which is received a central articulation part of the mounting element, the connector further including a front body that has an inverted U cross-section shape which straddles the central articulation part of the mounting element such that the two flanks extend longitudinally in relation to the front body, the connector received via longitudinal sliding in the front end of the arm, the connector including means for assuring locking according to the longitudinal direction in relation to the arm, characterized by the connector includes a holding rod that reaches vertically with play across an opposed aperture formed in the central articulation part of the mounting element.

What is claimed is:

1. A motor vehicle wiper including a mounting element belonging to a wiper blade articulated at a longitudinal end of a wiper arm around a transverse horizontal axis via a connector articulated on the mounting element, the connector including articulation means carried by two parallel, longitudinal, vertical flanks for receiving therebetween a central articulation part of the mounting element, the connector including a body having an inverted U-shaped cross-section straddling the central articulation part of the mounting element such that the two flanks extend longitudinally in relation to the body, the connector received via longitudinal sliding in the longitudinal end of the arm, the connector including means for locking against movement in a longitudinal direction in relation to the arm, characterized by the connector including a holding rod having a hook on an end thereof which is substantially orthogonal to the holding rod, the holding rod extending vertically within an aperture formed in the central articulation part of the mounting element, characterized by the longitudinal end of the arm comprising an upper transverse back, the connector including an elastic tongue extending horizontally toward the upper back of the arm and linked to the body at an end forming a hinge with a horizontal axis, the tongue including a boss received in a corresponding aperture formed in the upper back of the arm to longitudinally lock the connector in relation to the arm, and the holding rod extending vertically from a lower face of the tongue of the conector.

2. The wiper according to claim 1, characterized by the hook vertically holding the connector in relation to the mounting element.

3. The wiper according to claim 1, characterized by the holding rod being extended through the opposed aperture formed in the mounting element when the connector is attached on the mounting element.

4. The wiper according to claim 1, characterized by the boss being susceptible to being slanted towards a bottom of the connector via pivoting of the elastic tongue in order to free the longitudinal locking of the connector in relation to the arm.

5. The wiper according to claim 1, characterized by the longitudinal end of the arm including a rear abutment that, in the mounted position of the arm on the wiper blade, extends opposite from a surface of an abutment formed on a lateral external face of the mounting element.

6. The wiper according to claim 5, characterized by the flanks of the connector being received between two lateral flanges of the longitudinal end of the arm, characterized by the rear abutment being made up of a rear edge of one of the lateral flanges.

7. The wiper according to claim 1, characterized by the connector being longitudinally inserted between the lateral flanges of the longitudinal end of the wiper arm.

8. The wiper according to claim 1, characterized by the flanks of the connector being transversely spread away from each other toward a mounting position to allow the articulated mounting of the connector on the central articulation part of the mounting element in an articulation position where the articulation means of the connector cooperate with the mounting element, the mounting element being received between two lateral flanges formed on the longitudinal end of the arm for preventing the flanks of the connector from transversely spreading from the articulation position towards the mounting position.

9. The wiper according to claim 1, characterized by the flanks of the connector including two pins with a common horizontal axis, extending inwardly toward one another from internal faces of the flanks and in a direction opposite from two flanks formed on the longitudinal end of the arm surrounding the flanks of the connector when assembled, the pins to be received in corresponding orifices of the central articulation part of the mounting element in order to assure articulation of the connector when mounted on the blade.

10. A motor vehicle wiper including a mounting element belonging to a wiper blade articulated at a longitudinal end of a wiper arm around a transverse horizontal axis via a connector articulated on the mounting element, the connector including articulation means carried by two parallel, longitudinal, vertical flanks for receiving therebetween a central articulation part of the mounting element, the connector including a body having an inverted U-shaped cross-section straddling the central articulation part of the mounting element such that the two flanks extend longitudinally in relation to the body, the connector received via longitudinal sliding in the longitudinal end of the arm, the connector including means for locking in a longitudinal direction in relation to the arm, characterized by the connector including a holding rod extending vertically within an opposed aperture formed in the central articulation part of the mounting element, the longitudinal end of the arm including a rear abutment that, in the mounted position of the arm on the wiper blade, extends opposite from a surface of an abutment formed on a lateral external face of the mounting element, the flanks of the connector being received between two lateral flanges of the longitudinal end of the arm, the rear abutment being made up of a rear edge of one of the lateral flanges, and the abutment surface being an edge longitudinally defining a portion in relief of the lateral external face of the mounting element.

11. The wiper according to claim 10, characterized by the portion in relief being vertically defined by an upper edge with a longitudinal orientation and inclined to form a guiding ramp from the longitudinal end of the arm during the mounting of the arm on the connector.

* * * * *